E. O. SCHWEITZER.
DEVICE FOR PROTECTING INDUCTION MOTORS AND THE LIKE.
APPLICATION FILED AUG. 3, 1912.

1,157,051.

Patented Oct. 19, 1915.
2 SHEETS—SHEET 1.

Witnesses
Inventor
Edmund O. Schweitzer
by _____ atty.

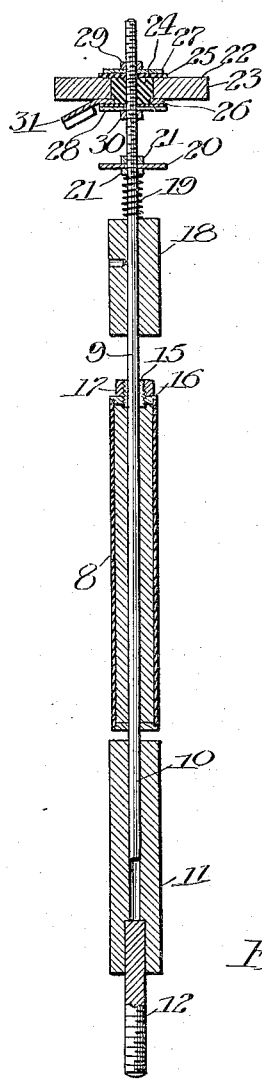
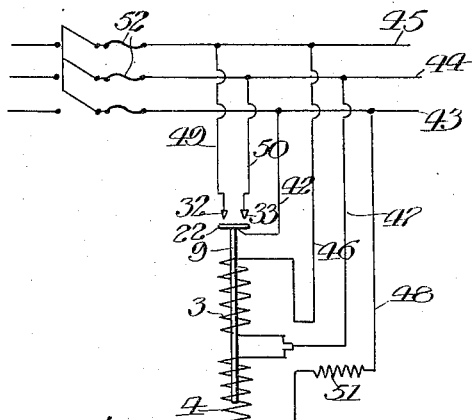
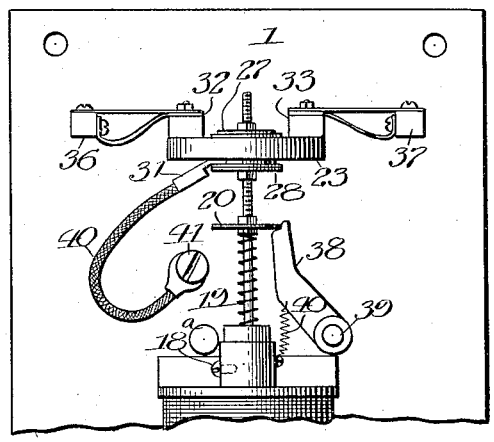
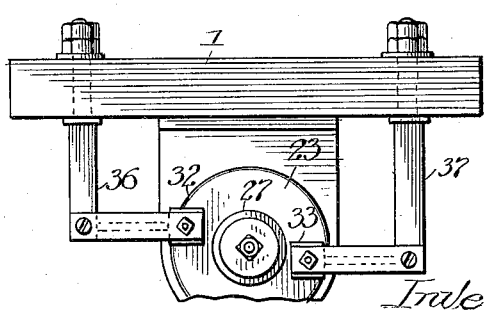

UNITED STATES PATENT OFFICE.

EDMUND O. SCHWEITZER, OF CHICAGO, ILLINOIS.

DEVICE FOR PROTECTING INDUCTION-MOTORS AND THE LIKE.

1,157,051.   Specification of Letters Patent.   Patented Oct. 19, 1915.

Application filed August 3, 1912. Serial No. 713,129.

*To all whom it may concern:*

Be it known that I, EDMUND O. SCHWEITZER, a citizen of the United States, residing at Chicago, in the county of Cook and State of Illinois, have invented a certain new and useful Improvement in Devices for Protecting Induction-Motors and the like, of which the following is a full, clear, concise, and exact description, reference being had to the accompanying drawings, forming a part of this specification.

My invention relates to devices for protecting induction motors or other devices from improper connection or arrangement of the leads or line wires of a polyphase system.

One specific use of the invention is in connection with induction motors for elevators. In such apparatus the improper connection of the motor would obviously cause very damaging results by starting the elevator in the wrong direction.

Prominent objects of the invention are to provide a simple, practical, and efficient device of this character; to reduce the cost of making the same; to make the device stable and not liable to derangement; to make unnecessary the attendance of an expert after installation, and to require the attention of the central station after the device has operated before it can be put into service again.

In the device for carrying out my invention herein set forth I arrange to automatically control the circuit so as to open the same or otherwise control it upon the improper connection of the leads or circuit connectors. This is conveniently done by means of a solenoid arrangement ordinarily inoperative when the leads are properly connected but operative to control the circuit when the leads are improperly connected.

Figure 1:
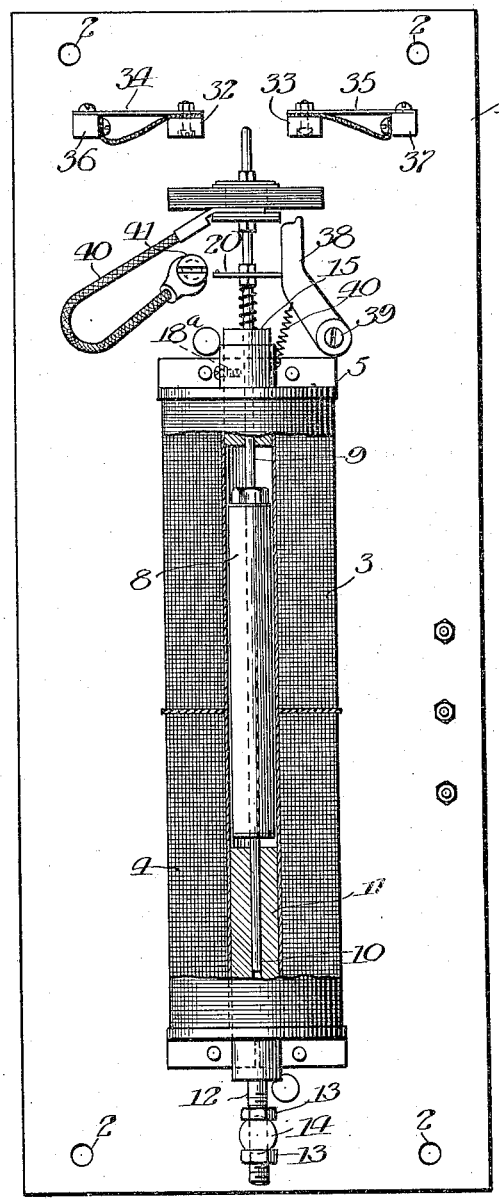
Figure 2:
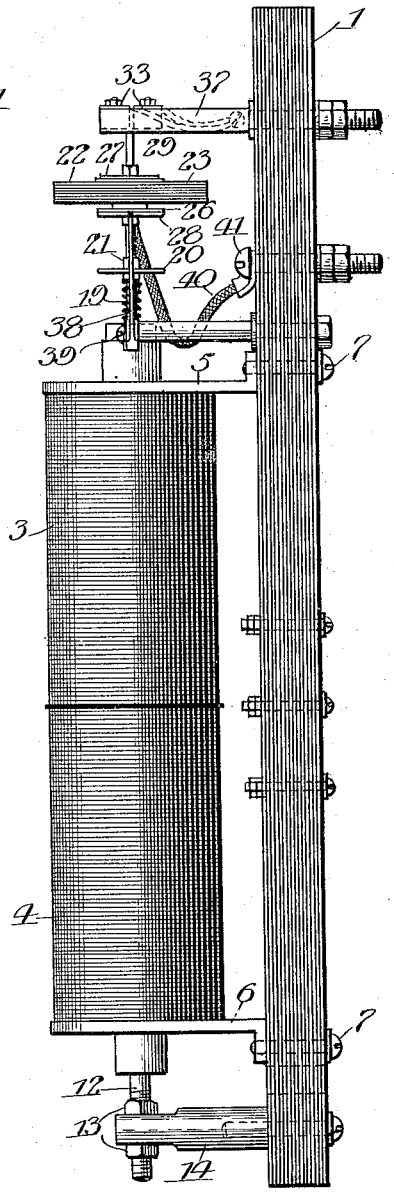

In the accompanying drawings, Figure 1 is a front elevation of a device embodying my invention; Fig. 2 is a side elevation of the same; Fig. 3 is a detail of a part of the apparatus; Fig. 4 is an elevation of the upper part of the apparatus as shown in Fig. 1, showing the same in an operative condition; Fig. 5 is a plan view of the device; Fig. 6 is a diagram view of the circuit arrangement.

The device shown comprises a base or support 1, intended for vertical arrangement and conveniently in the form of a flat board or plate provided with apertures 2—2 through which screws or bolts may be passed to hold the same in an upright position. Upon this are mounted one above the other and end to end a pair of solenoids 3, 4 which are conveniently held in vertical position by supports 5, 6, in the form of plates secured to the board 1 by screws 7—7. Within the central bore of these solenoids is arranged an iron core 8 which is common to both solenoids and has a length about equal to the length of one solenoid. This core is free to move vertically in the hollow bore of the two solenoids, being as a convenient arrangement mounted upon a spindle or plunger 9 whose lower end fits loosely in the bore 10 of a plug 11 fitted into the lower end of the lower solenoid 4, the plug 11 being constructed with a pin 12 extending down from its lower end and engaged by set nuts 13—13 arranged on opposite sides of a post 14 secured to the supporting board 1. The pin or rod 12 is screw threaded so as to permit adjustment of the plug 11 which forms a stop and guide. While the core 8 can be of any suitable construction, it is desirably made in the form of a fiber tube filled with a high grade iron as shown in Fig. 3. The upper end of the core 8 is held in position by a threaded sleeve 15 secured as by soldering to the spindle 9, and a metal plunger cap 16 and a nut 17, the cap or washer 16 being fitted down over the threaded sleeve 15 and held in place against the upper end of the fiber tube 8 by the threaded nut 17. Above the core 8 is an upper stop and guide 18 desirably made of iron and held in place by screws 18ª. Above this is a spiral spring 19 and above the latter a metal stop and catch 20 firmly secured to the spindle 9 as by threading the spindle and putting set nuts 21—21 on opposite sides of the disk-like stop and catch 20. Near the upper end of the spindle 9 is mounted an insulated contact device 22 conveniently in the form of a carbon disk 23 having a large central bore containing a hub or bushing 24 of insulating material, as for example fiber, mounted upon the threaded end of the spindle 9. Insulating material washers 25 and 26 are arranged above and below the carbon disk 23 respectively, and metal washers 27 and 28 are arranged above and below the washers 25 and 26 respectively, with threaded nuts 29 and 30 above and below the latter. A metal terminal member or lug 31 is arranged below the disk 23 and between the same and the insulating disk 26, being in contact with the carbon disk 23.

Two contact devices 32 and 33 (Figs. 1 and 2) are mounted upon the upright support 1, being conveniently suspended from metal spring strips 34 and 35 respectively, which latter are mounted upon posts 36 and 37 respectively secured to the supporting board 1. The contacts 32 and 33 are located above the insulated contact disk 22 so that when the spindle 9 rises sufficiently the contact 22 will strike against and make contact with the contacts 32 and 33. A swinging lever arm 38 is pivoted upon the support 1 at 39 and is held down by a spring 40 so that when the spindle 9 rises sufficiently to cause the contact 22 to come into contacts 32 and 33 the lever arm 38 will be swung over as shown in Fig. 4, so that its end slips in under the washer 20 and engages the same to hold the spindle in an elevated position. The contact lug or terminal 31 is connected by a flexible conductor 40 with a binding post 41 on the support 1, and this binding post 41 is in turn connected by a conductor 42 with one of the leads or line wires 43, of a 3-phase system as shown in the diagram, Fig. 6. The solenoids 3 and 4 are connected with the leads or line wires 45, 44 and 43 by wires 46, 47 and 48 respectively. The contacts 32 and 33 are connected with the lines wires 45 and 44 respectively by conductors 49 and 50. A high resistance 51 is shown included in the conductor 48. Fuses 52 are shown included in the line wires 43, 44 and 45 and the connection of the protecting device is shown between said fuses and the motor or other load. Thus it will be seen that when the line wires are connected in proper manner to the device the movable magnetic core or member will remain in a lowered position because of the direction of the lines of the field of force, but when the connections are improperly made or reversed, the magnetic member will rise due to a reversal of the direction of the lines of force of the magnetic field and cause the contact disk 22 to make contact with the members 32, and 33, thereby short circuiting the line wires and causing the fuses 52 to blow. This will protect the motor or other device to be protected and will require attention from the central station to insert new fuses before the circuit can be put into operation again.

It will be understood that changes and modifications can be made without departing from the spirit of the invention.

What I claim is:

1. A device of the class specified comprising vertically arranged magnetic coils adapted for connection in a polyphase circuit, a vertically movable core member having a core influenced by said coils so as to shift said core member vertically and upwardly upon a reversal of phase in said coils, circuit connections arranged to be closed upon an upward movement of said core member, and a spring controlled latch adapted to engage and hold said core member when elevated to an extent to close the circuit.

2. A reverse phase relay comprising in combination, a solenoid, a magnetic member mounted within said solenoid adapted to move axially thereof, a spindle connected to said member, a contact carried by said spindle, a disk also carried by said spindle, a pivoted arm, and a spring throwing said arm against the edge of said disk in the normal position of said member, said arm being adapted to engage the face of said disk upon the movement of said member in one direction.

In witness whereof, I hereunto subscribe my name this 1st day of August, A. D. 1912.

EDMUND O. SCHWEITZER.

Witnesses:
A. L. JONES,
HAZEL JONES.

Copies of this patent may be obtained for five cents each, by addressing the "Commissioner of Patents, Washington, D. C."